United States Patent
Pesquet-Popescu

(10) Patent No.: US 6,898,324 B2
(45) Date of Patent: May 24, 2005

(54) COLOR ENCODING AND DECODING METHOD

(75) Inventor: Beatrice Pesquet-Popescu, Fontenay-Sous-Bois (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 720 days.

(21) Appl. No.: 09/881,598

(22) Filed: Jun. 14, 2001

(65) Prior Publication Data

US 2002/0009233 A1 Jan. 24, 2002

(30) Foreign Application Priority Data

Jun. 14, 2000 (EP) .............................................. 00401683

(51) Int. Cl.⁷ ............................. G06K 9/36; G06K 9/46; H04N 7/12
(52) U.S. Cl. ....................... 382/240; 382/166; 382/232; 348/384.1
(58) Field of Search ................................ 382/166, 240, 382/232; 348/384.1; 341/79; 375/240

(56) References Cited

PUBLICATIONS

A.Said, W.A.Pearlman,"A New, Faast, and Efficient Image Codec Based on Set Partitioning in Hierarchical Trees" Jun., 1996, pp. 243–250 (Abstract).
S.J. Choi, J.W.Woods, "Motion–Compensated 3–D Subband Coding of Video", Feb., 1998, pp. 155–167. (Abstract).
Pesquet–Popescu B., "Improved Color Coding for Scalable 30 Wavelet Video Compression", EUSIPCO 2000, Sep. 2000, pp. 1481–1484, XP001030175.

Primary Examiner—Bhavesh M. Mehta
Assistant Examiner—John Strege

(57) ABSTRACT

The invention relates to an encoding method for the compression of a video sequence which is organized in groups of frames decomposed by means of a wavelet transform. The method is based on the hierarchical subband encoding process SPIHT that transforms the original set of picture elements (pixels) into coefficients ordered by means of three ordered lists called list of insignificant sets (LIS), list of insignificant pixels (LIP) and list of significant pixels (LSP). This SPIHT algorithm, comprising the following steps: initialization, sorting pass(es), refinement pass, and quantization step update, is characterized in that:

(a) in the initialization step, the three coefficients corresponding to the same location in the three color planes Y, U and V are put sequentially in the LIS in order to occupy neighboring positions and to remain together in said LIS for the following sorting passes if they all have insignificant offspring when analyzed one after the other at each significance level, and the last bitplane for which insignificant offspring in luminance implies insignificant offspring in chrominance, $n_i$, is computed based on set significance level of the coefficients in the root subband and output in the bitstream;

(b) in the sorting pass(es) going from $n_{max}$ to $n_i$, when a luminance coefficient has insignificant offspring and if the three following conditions are satisfied by the two coefficients that follow said coefficient in the LIS:
they are U and V coefficients respectively;
they have the same spatio-temporal coordinates as said luminance coefficient;
they also have insignificant offspring;
then this situation is coded by only a unique symbol.

2 Claims, 3 Drawing Sheets

YUVYUVYUVYUVYUVYUV

COLOR ENCODING AND DECODING METHOD

The present invention relates to an encoding method for the compression of a video sequence including successive frames organized in groups of frames, each frame being decomposed by means of a three-dimensional (3D) wavelet transform leading to a given number of successive resolution levels, said encoding method being based on the hierarchical subband encoding process called "set partitioning in hierarchical trees" (SPIHT) and leading from the original set of picture elements (pixels) of each group of frames to wavelet transform coefficients encoded with a binary format and constituting a hierarchical pyramid, said coefficients being organized into a spatio-temporal orientation tree rooted in the lowest frequency (or approximation subband) resulting from the 3D wavelet transform and completed by an offspring in the higher frequency subbands, the coefficients of said tree being ordered into partitioning sets involving the pixels and corresponding to respective levels of significance, said sets being defined by means of magnitude tests leading to a classification of the significance information in three ordered lists called list of insignificant sets (LIS), list of insignificant pixels (LIP) and list of significant pixels (LSP), said tests being carried out in order to divide said original set of pixels into said partitioning sets according to a division process that continues until each significant coefficient is encoded within said binary representation, and said spatio-temporal orientation tree defining the spatio-temporal relationship inside said hierarchical pyramid, and said SPIHT algorithm comprising the following steps : initialization, sorting pass(es), refinement pass, and quantization step update.

The invention also relates to a corresponding decoding method.

With the recent expansion of multimedia applications, video coding systems are expected to become highly scalable. In multimedia applications, compressed video sequences are indeed often streamed in a multicast way towards a panel of receivers with different requirements and capabilities. One approach for delivering multiple levels of quality across multiple network connections is then to encode the video signal with a set of independent encoders each producing a different output rate. The major drawbacks of this "simulcast" solution are mainly its sub-optimal compression performance and its huge storage.

Video coding systems are now expected to become more flexible: in particular they may be able to adapt a single video bitstream to variable transport conditions (bandwidth, error rate . . . ) as well as to varying receiver capabilities and demands (CPU, display size, application . . . ). In this framework, "scalability" is the expected functionality to address these issues. The term "scalable" refers to methods which allow partial decoding of the compressed bitstream: depending on the conditions (bitrate, errors, resources), the decoder can read parts of the stream and decode the pictures at different quality levels.

Current standards like H.263, MPEG-2 or MPEG-4 are based on block DCT coding of displaced frame differences (DFD), and scalability is implemented through additional levels of a single-scale prediction loop. However, their efficiency in what concerns resolution and rate scalability is limited and can be improved by looking in the direction of progressive encoding techniques based on subband decompositions. Indeed, wavelets offer a natural multiscale representation for still images and video, and their high efficiency in progressively encoding images yields a scalable representation. The multiscale representation can be extended to video data by a tridimensional (3D), or spatio-temporal (2D+t), wavelet analysis which includes the temporal dimension within the decomposition. The introduction of a motion compensation step in such a 3D subband decomposition scheme leads to a spatio-temporal multiresolution (hierarchical) representation of the video signal, which considerably outperforms hybrid coders at low bit rates.

Subband decompositions naturally lead to scalable schemes, and coding algorithms exploiting the dependencies that exist along hierarchical spatio-temporal trees yield the best compression performances, together with desirable properties like the bitstream embedding. These algorithms were recently extended to 3D video coding systems, obtaining some of the most effective scalable video coders: the 3D set partitioning in hierarchical trees (SPIHT) encoder and a variant of this encoder, based on tri-zerotrees. Most of the existing coding methods consider a unique coding strategy and apply it to code independently each color plane. The generated bitstream concatenates three clearly separated bitstreams, corresponding to each color plane. However, this strategy does not fit into a scalable method, since for a low bitrate no bit corresponding to the chrominance information is decoded.

It is an object of the invention to propose a new method for encoding the chrominance coefficients, able to eliminate this drawback.

To this end, the invention relates to an encoding method such as defined in the introductory part of the description and which is moreover characterized in that, according to the algorithm indicated in the appendix B:

(a) in the initialization step:

the three coefficients corresponding to the same location in the three color planes Y, U and V are put sequentially in the LIS in order to occupy neighboring positions and to remain together in said LIS for the following sorting passes if they all have insignificant offspring when analyzed one after the other at each significance level;

the last bitplane for which insignificant offspring in luminance implies insignificant offspring in chrominance, $n_i$, is computed based on set significance level of the coefficients in the root subband and output in the bitstream;

(b) in the sorting pass(es) going from $n_{max}$ to $n_i$, when a luminance coefficient has insignificant offspring and if the three following conditions are satisfied by the two coefficients that follow said coefficient in the LIS:

they are U and V coefficients respectively;

they have the same spatio-temporal coordinates as said luminance coefficient;

they also have insignificant offspring;

then this situation is coded by only a unique symbol, the output bistream being not modified with respect to the original SPIHT algorithm in all the other cases.

The proposed method advantageously exploits the redundancy existing between the spatio-temporal orientation trees of luminance and chrominance. It also provides a stronger embedding of the color in the resulting bitstream than the original SPIHT algorithm, with respect to which it leads to an increased coding efficiency and an improved perceptual quality for a progressive decoding of the concerned compressed video sequence.

The invention also relates to a decoding method for the decompression of a video sequence which has been processed by such an encoding method, the "output" operations of the encoding algorithm being however replaced by "input" operations in the corresponding decoding algorithm.

The present invention will now be described, by way of example, with reference to the accompanying drawings in which.

Figure 1:
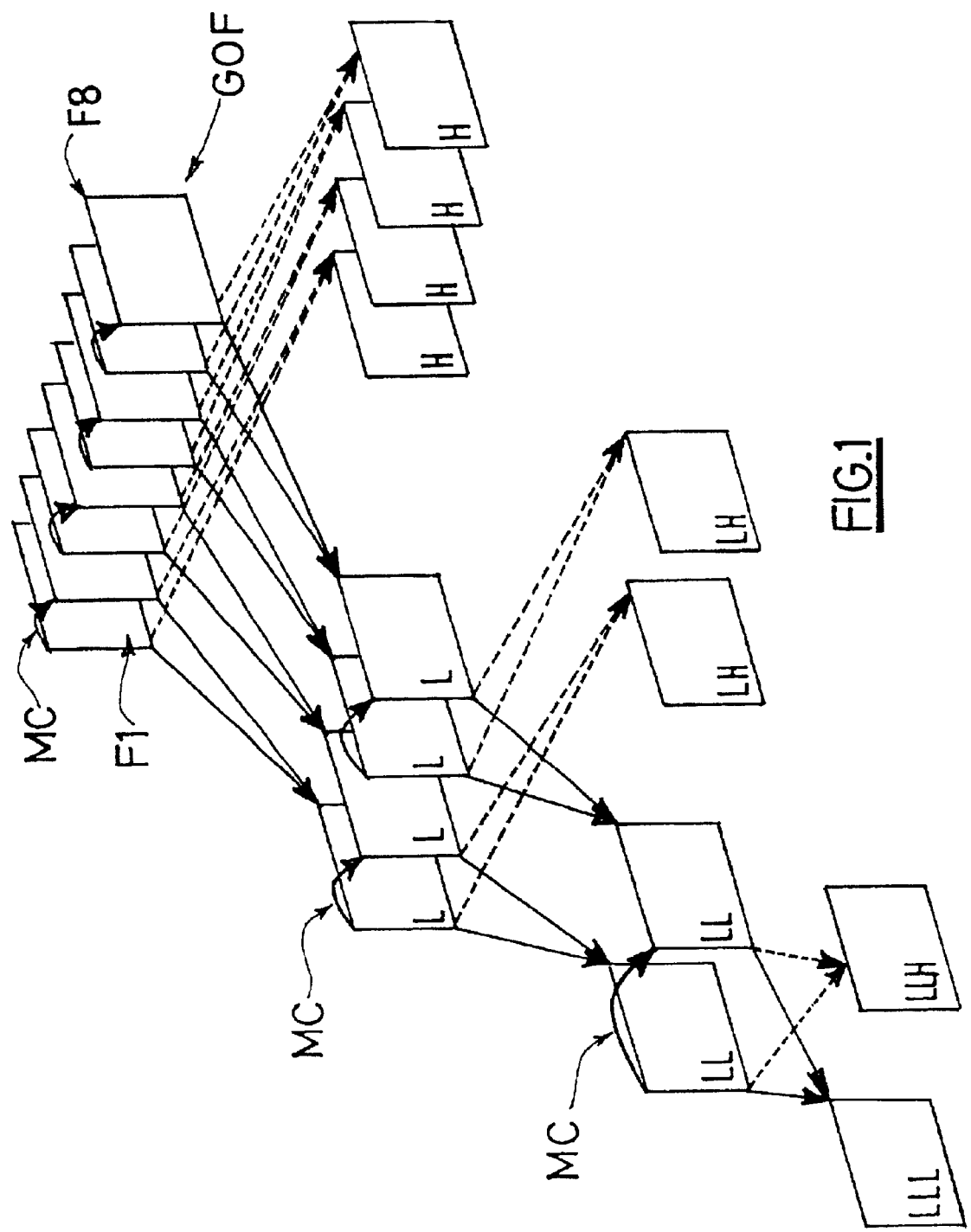
FIG. 1 illustrates a temporal subband decomposition of the video information, with motion compensation.

A temporal subband decomposition of a video sequence is shown in FIG. 1. The illustrated 3D wavelet decomposition with motion compensation is applied to a group of frames (GOF), referenced F1 to F8. In this 3D subband decomposition scheme, each GOF of the input video is first motion-compensated (MC) (this step allows to process sequences with large motion) and then temporally filtered (TF) using Haar wavelets (the dotted arrows correspond to a high-pass temporal filtering, while the other ones correspond to a low-pass temporal filtering). In FIG. 1, three stages of decomposition are shown (L and H=first stage; LL and LH=second stage; LLL and LLH=third stage). The main advantages of this 3D wavelet decomposition over a predictive scheme are:

the capability of achieving temporal scalability, which can naturally be obtained by a reconstruction at a variety of temporal resolutions;

a higher energy compaction than in classical predictive schemes;

a non recursive decoder structure, which avoids propagation of transmission errors;

the possibility to introduce an efficient protection of the information data against transmission errors.

The operation MCTF (motion compensated temporal filtering), performing a temporal filtering in the direction of the motion, is applied hierarchically over several temporal resolution levels and results in a temporal decomposition tree in which the leaves (temporal subbands) contain several frames. These frames are further spatially decomposed and yield the spatio-temporal trees of wavelet coefficients. A very flexible solution has then been chosen for the implementation of the spatial multiresolution analysis: so-called lifting or ladder scheme decomposition. The SNR (or quality) scalability is provided by a modified SPIHT algorithm. According to the SPIHT technique, described for example in "A new, fast, and efficient image code based on set partitioning in hierarchical trees", by A. Said and W. A. Pearlman, IEEE Transactions on Circuits and Systems for Video technology, vol. 6, n°3, June 1996, pp. 243–250, the wavelet transform coefficients of the spatio-temporal tree are divided into sets defined by the level of the most significant bit in a bit-plane representation of their magnitudes. This partitioning algorithm takes advantage of the energy repartition in spatio-temporal orientation trees in order to create large subsets of insignificant coefficients. In the algorithm, three sets of coefficients are manipulated: the List of Insignificant Sets (LIS), the List of Insignificant Pixels (LIP) and the List of Significant Pixels (LSP). Coefficients from the approximation subband are used to initialize the LIP, and, among them, those with descendants are used to initialize the LIS. Comparisons with fixed thresholds are realized on subsets, which are further split until single significant coefficients are isolated and transferred to the LSP to be further refined.

Before describing the coding method according to the invention, it is assumed that the video sequences are in QCIF format (176×144 pixels) and that three levels of temporal and spatial wavelet decomposition are performed. The principle also applies to sequences having an image size multiple of $2^{n+1}$ on which n levels of decomposition are performed.

It must be mentioned that the 4:2:0 format, often used for video sequences representation, raises a problem concerning the depth of the spatio-temporal decomposition trees, which may really alter the performances of the SPIHT algorithm. On the one hand, this technique only works well with subbands of even size. On the other hand, the difference of sizes between luminance and chrominance prevents from applying the same decomposition for the three planes. To avoid this problem and choose the suitable number of decomposition levels for the chrominance planes, two strategies have been defined:

1) the same number of resolution levels is considered for the luminance and the chrominance multiresolution analysis, which leads to odd-sized subbands at the lowest resolution level of the chrominance planes, that the original SPIHT algorithm cannot manage without adaptation (for example, for QCIF frames, of 176×144 pixels, and three levels of decomposition, the luminance root subband has 22×18 pixels, while the chrominance approximation subbands have 11×9 pixels);

2) the appropriate number of decomposition levels is chosen for each color plane (n for Y-plane and n−1 for U- and V-planes), in such a way that the SPIHT algorithm can be applied directly, which means three levels for the luminance and two levels for the chrominance planes, in the case of QCIF frames.

Figure 2:
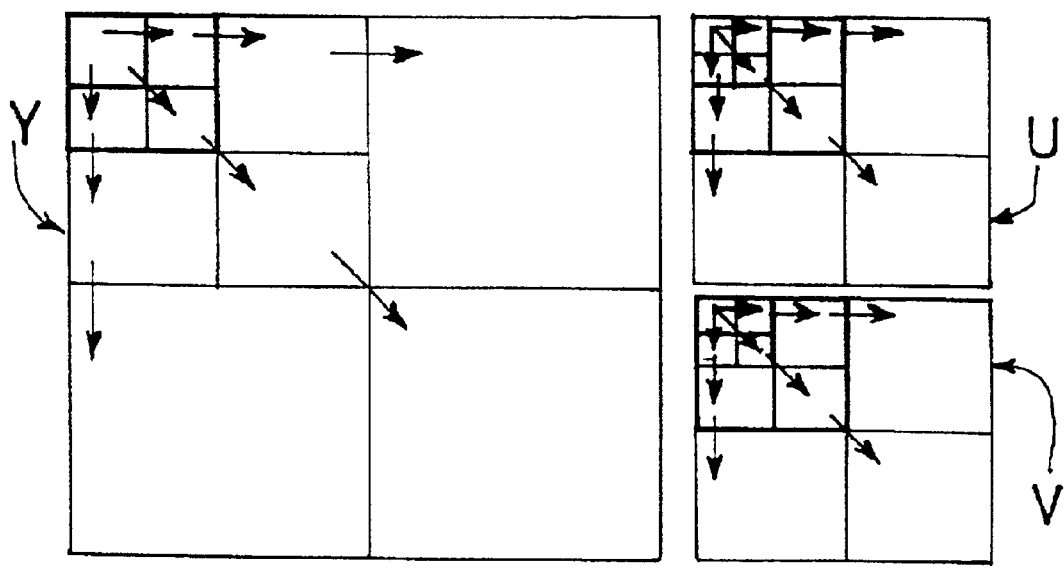
FIG. 2 shows the spatial dependencies in the original SPIHT algorithm, the arrows indicating the parent-offspring relations in the Y-plane, the U-plane and the V-plane.

The first strategy is described in the document "Motion-compensated 3D subband coding of video", by S. J. Choi and J. W. Woods, IEEE Transactions on Image Processing, vol. 8, n°2, February 1998, pp. 155–167. The wavelet decomposition of the three color planes is illustrated in FIG. 2, showing the dependencies in the original SPIHT algorithm (as well as the parent-offspring relations, indicated by the arrows). The LIP and LIS are initialized with the appropriate coordinates of the top level in all the three planes. To solve the problem of odd-sized subbands, a spatial extrapolation is performed on the lowest spatio-temporal subband frames. The extrapolation is consequently applied to the original image. When decomposing this image, artificially created coefficients must be encoded and thus the efficiency of the algorithm decreases. The same kind of artifacts is introduced during the motion compensation. These extrapolations inevitably increase the final bitrate. Moreover, this solution does not exploit the redundancy between Y-, U- and V-planes.

Figures 3, 5:
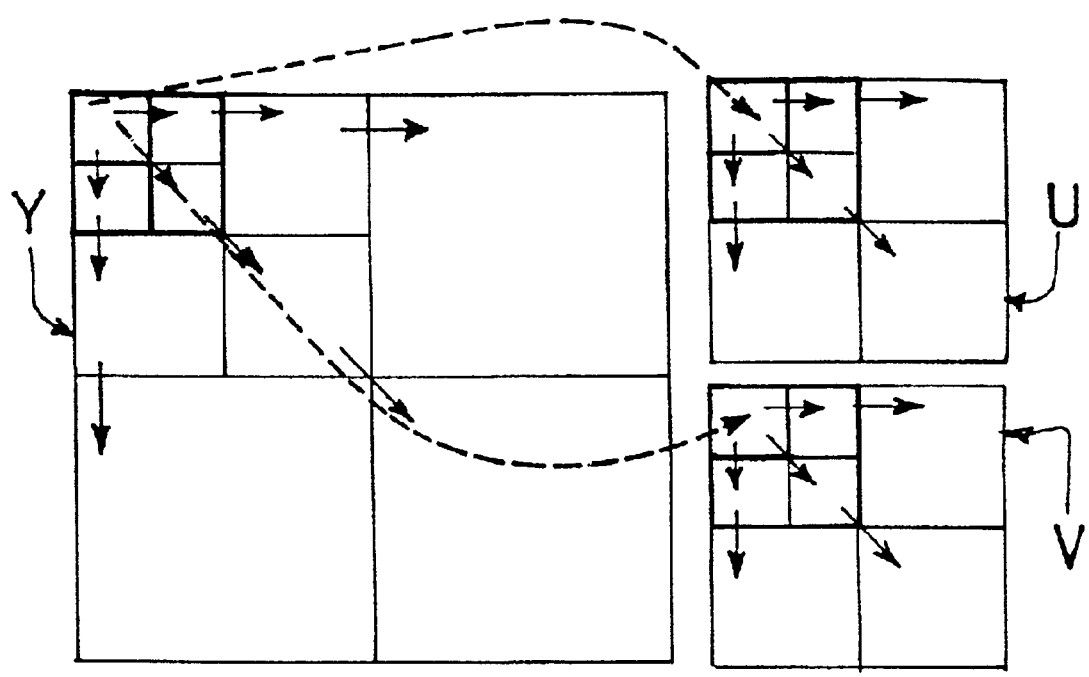
FIG. 3 shows, with respect to FIG. 2, the additional dependencies between color planes decompositions, as introduced by the implementation of the encoding method according to the present invention.
FIG. 5 illustrates said initial structure in the case of the method according to the invention.

The present invention exploits the second strategy and uses the fact that the U- and V-planes in the 4:2:0 format are already in a subsampled format with respect to the luminance plane. Therefore the full resolution chrominance planes may be seen as an approximation of the fall resolution luminance one. When performing a wavelet decomposition over several resolution levels, the n-th resolution level of the luminance has the same size as the (n−1)-th level of the chrominance. This is illustrated in FIG. 3, that shows the additional dependencies between color planes decompositions introduced by the proposed method (unbroken arrows indicate parent-offspring relations, while dashed arrows correspond to the dependence relations between luminance and chrominance planes). The embedding of the three component planes is achieved by simultaneously processing the coefficients of the root subband coming from the three color spatio-temporal trees, which are used to set both LIP and LIS.

A first observation which can be made and has been verified on several sequences is that, with a high probability, the chrominance coefficients have smaller amplitudes than the luminance ones in the root subband, for natural sequences. According to the invention, it is then assumed that if a luminance coefficient has a non-significant offspring at a given bitplane level, the chrominance coefficients at the same location also have a high probability to have non-significant offspring. The non-significance of the three spatio-temporal zero-trees can be therefore encoded by a unique symbol. This is possible if the three coefficients corresponding to the same location in the three color planes are in neighbor locations in the LIS. A special initialization of this list will correctly order the coefficients.

Figure 4:
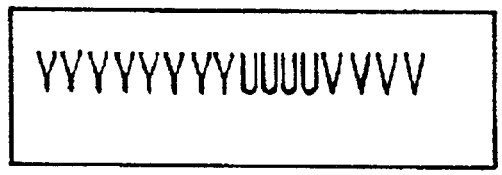
FIG. 4 illustrates in the original SPIHT algorithm the initial structure of the lists LIS and LIP.

This initialization is illustrated in FIGS. 4 and 5, where FIG. 4 corresponds to the original initialization and FIG. 5 to the proposed special initialization. In the original initialization, all the luminance coefficients from the root subband are first put in the LIS, then the chrominance ones are included. In the proposed initialization, the three coefficients from the root subband, Y, U and V, having the same spatio-temporal coordinates, are put sequentially in the LIS. Another advantage of mixing the color planes as proposed is a better embedding of the chrominance in the final bitstream.

After the initialization, at each significance level the algorithm analyses one after the other the Y, U, V components. If they all have insignificant offspring, then they will remain together in the LIS for the following sorting passes of the SPIHT algorithm. The algorithm modifies the sorting pass such that, for each luminance coefficient having insignificant offspring, it is looked if the two coefficients that follow it in the LIS are U and V, and if they all have the same spatio-temporal coordinates. In this case, it is verified that they also have insignificant offspring, and this case is then coded by a 0 bit. In all the other cases, the output bitstream is not modified with respect to the original algorithm.

However, the hypothesis originally made (basic assumption) is not satisfied for all the significance levels ($n_{max}$ being the maximum significance level). Typically, it is always verified at the first levels, while the lowest significance levels do not verify it. The precise bitplane level where this change in behavior appears depends on the sequence and has to be determined before beginning the encoding. The task of finding this level is performed during the initialization step, and it is output together with the maximum number of significance levels. Moreover, this task is facilitated by the fact that the set significance level SSL associated to each coefficient is computed at the beginning of the algorithm. The interlacing level, $n_i$, is obtained by means of the following relation (1):

$$n_i = \min_{x,y,z} \{SSL_y(x,y,z) \text{ such as } SSL_y(x,y,z) \geq SSL_U(x,y,z) \text{ and } SSL_y(x,y,z) \geq SSL_V(x,y,z)\} \quad (1)$$

Practically, this level $n_i$ is computed as follows. For each bitplane, and for each pixel in the root subband, the set significance level SSL is already available. So, if a luminance coefficient with insignificant offspring is followed by the chrominance coefficients at the same location, only the luminance insignificance is then encoded. The first bitplane where this condition is not satisfied is $n_i$.

Performing this step only once also avoids repetitively computing the significance of the tree and comparing it to decreasing thresholds during the successive sorting passes. The original and the proposed algorithm are given in the appendices A and B, in pages 9 to 11. Experimental results highlight the impact of the improved SPIHT color coding algorithm on the coder compression performances for the chrominance planes.

The encoding method hereinabove described, which takes advantage of the dependencies between the luminance and chrominance components to provide a more effective compression, has the following main advantages:

the U and V planes are decomposed over a reduced number of resolution levels, which reduces the computational complexity of the algorithm;

the dependencies between luminance and chrominance components are exploited through the spatio-temporal trees: more precisely, if a luminance coefficient has insignificant offspring, then the corresponding chrominance coefficients are also very likely to have insignificant offspring, which is exploited to efficiently encode the three offspring trees;

no extrapolation is needed and therefore no artificial coefficients are introduced: only real pixels are decomposed and coded, and an additional degree of simplification is introduced in the algorithm, as no motion vectors are computed and coded for these artificial pixels;

the complete embedding of the resulting bitstream is ensured, since the luminance and chrominance components of a pixel are now very close in the three lists (it must be reminded that, in the original algorithm, the LIP and LIS initialization is done by separating the Y-, U- and V-coefficients, which implies a sequential processing of them at each resolution level.

Some details on a possible implementation are now given. The choice of the number of frames composing a GOF must be preferably a trade-off between the delay caused by processing too many frames and the energy compaction achieved by the temporal wavelet analysis performed over a sufficient number of resolution levels. In the experiments conducted, a GOF of 16 frames was shown to yield the best compression results. A full search block matching algorithm was implemented, with half pixel accuracy. When Haar filters are used for the temporal decomposition, it may be noted that motion estimation and motion compensation (ME/MC) are only performed every two frames of the input sequence due to the temporal down-sampling by two. By iterating this procedure over several decomposition levels in the approximation subband, the total number of ME/MC operations is roughly the same as in a predictive scheme. The motion vectors are differentially encoded and they are put in a bitstream, at the beginning of the GOF.

However, any error occurring in this part of the bistream may cause important damages in the reconstructed sequence. To ensure robustness to channel errors, an unequal error protection of the two parts of the bitstream may be introduced. The lifting implementation of the spatial decomposition enables a great flexibility at the line or column level in what concerns the type of operators used.

When compared to the original SPIHT algorithm, the proposed method leads to improved coding efficiency and perceptual quality for a progressive decoding of a compressed video sequence. When this method is applied for instance on color video QCIF sequences with a frame size of 176×144 pixels, a 4:2:0 subsampled format and a frame rate of 10 f/s, experimental results obtained at low bit rates illustrate the impact of said method on the compression performances for the chrominance planes. Due to the automatic bit allocation between the luminance and the chrominance planes, the bit savings obtained thanks to the present method in the chrominance domain are distributed among the luminance and the chrominance planes and lead to an improvement in these three domains.

The method may then be considered as a competitor to the MPEG-4 standard, especially at low bit rates because the proposed method principally modifies the LIS coding, whose influence with respect to the budget allocated to the LSP is less important with higher bit budgets. It should also be noticed that the encoding of intra-frames with MPEG-4 results indeed in a very fluctuating quality; in particular, PSNR peaks occur for the inter-coded frames that follow each intra-coded frame, due to the buffer control strategy. With the proposed approach, frames that make up the GOF are treated together, which results in more uniform PSNR variations over the whole sequence.

APPENDIX A

The function $S_n()$ denoting the significance of a pixel or a set of pixels for a given level n and the coefficients of the wavelet transform being denoted by $c_{x,y,z}$, chroma, the original algorithm performs as follows:

1. Initialization:
output n=$\lfloor \log_2(\max_{(x,y,z,chroma)}\{|c_{x,y,z,\,chroma}|\}) \rfloor$, set the LSP as an empty list, and add the coordinates (x,y,z, chroma) ∈ H to the LIP, and only those with descendants also to the LIS, as type A entries, according to the following order: (x,y,z, chroma=Y) for all (x,y,z) ∈ H, then (x,y,z, chroma= U) for all (x,y,z) ∈ H, then (x,y,z, chroma=V) for all (x,y,z) ∈ H.
2. Sorting pass:
2.1 For each entry (x,y,z, chroma) in the LIP, do:
2.1.1 output bit=$S_n$(x,y,z, chroma);
2.1.2 if (bit=1), then:
  move (x,y,z,chroma) to the LSP and output bit=sign(x,y,z,chroma);
2.2 For each entry (x,y,z,chroma) in the LIS, do:
2.2.1 if the entry is of type A, then:
  output bit=$S_n$(D(x,y,z, chroma));
  if (bit=1), then:
  a) for each (x', y', z', chroma) ∈ O(x,y,z, chroma), do:
  output bit=$S_n$(x',y',z', chroma);
  if (bit=1), then:
  move (x',y',z', chroma) to the end of LSP and output bit=sign(x',y',z', chroma);
  else move (x',y',z', chroma) to the end of the LIP;
  b) if L(x,y,z, chroma)≠0, then move (x,y,z, chroma) to the end of the LIS as an entry of type B, and go to step 2.2.2, else remove entry (x,y,z, chroma) from the LIS;
2.2.2 if the entry is of type B, then:
  output bit=$S_n$(L(x,y,z, chroma));
  if (bit=1), then:
  a) add each (x',y',z', chroma) ∈ O (x,y,z, chroma) to the end of the LIS as an entry of type A;
  b) remove (x,y,z chroma) from the LIS.
3. Refinement pass:
For each entry (x,y,z, chroma) in the LSP, except those included in the last sorting pass (i.e., with same n), output the $n^{th}$ most significant bit of $c_{(x,y,z,\,chroma)}$;
4. Quantization-step update: decrement n by 1 and go to step 2.

APPENDIX B

The function $S_n$ and the coefficients of the wavelet transform are similarly denoted. The next coefficient after the current one in LIS is denoted by "next", and the coefficient after this coefficient "next" is denoted by "next 2", their coordinates and chrominance being then indexed respectively: (x,y,z)_next, chroma_next, (x,y,z)_next 2, and chroma_next 2. The proposed algorithm then performs as follows (bold text corresponds to modified processed steps):
1. Initialization:
output n=$\lfloor \log_2(\max_{(x,y,z,\,chroma)}\{|c_{x,y,z,\,chroma}|\}) \rfloor$, output n_color, the last bitplane level for which insignificant offspring in luminance implies insignificant offspring in chrominance, set the LSP as an empty list, and add the coordinates (x,y,z, chroma) ∈ H to the LIP, and only those with descendants also to the LIS, as type A entries, according to the same order for each spatio-temporal coordinate (x,y,z) ∈ H.
2. Sorting pass:
2.1 For each entry (x,y,z, chroma) in the LIP, do:
2.1.1 output bit=$S_n$(x,y,z, chroma);
2.1.2 if(bit=1), then:
  move (x,y,z, chroma) to the LSP and output bit=sign(x,y,z, chroma);
2.2 For each entry (x,y,z, chroma) in the LIS, do:
2.2.1 if the entry is of type A, then:
  bit=$S_n$(D(x,y,z, chroma));
  if n>n_color:
  if (bit=0 and chroma=Y), then:
  if (chroma_next=U and chroma_next 2=V), then:
  if((x,y,z)=(x,y,z)_next=(x,y,z)_next 2), then:
  move forward of two coefficients in the LIS
  else: output bit, and break.
  if (bit=1), then:
  a) for each (x', y', z', chroma) ∈ O(x,y,z, chroma), do:
  output bit=$S_n$(x',y',z', chroma);
  if (bit=1), then:
  move (x',y',z', chroma) to the end of LSP and output bit=sign(x',y',z', chroma);
  else move (x',y',z', chroma) to the end of the LIP;
  b) if L(x,y,z, chroma)≠0, then move (x,y,z, chroma) to the end of the LIS as an entry of type B, and go to step 2.2.2, else remove entry (x,y,z, chroma) from the LIS;
2.2.2 if the entry is of type B, then:
  output bit=$S_n$(L(x,y,z, chroma));
  if (bit=1), then:
  a) add each (x',y',z', chroma) ∈ 0 (x,y,z, chroma) to the end of the LIS as an entry of type A;
  b) remove (x,y,z chroma) from the LIS.
3. Refinement pass:
For each entry (x,y,z, chroma) in the LSP, except those included in the last sorting pass (i.e., with same n), output the $n^{th}$ most significant bit of $c_{(x,y,z,\,chroma)}$;
4. Quantization-step update: decrement n by 1 and go to step 2.

What is claimed is:

1. An encoding method for the compression of a video sequence including successive frames organized in groups of frames, each frame being decomposed by means of a three-dimensional (3D) wavelet transform leading to a given number of successive resolution levels, said encoding method being based on the hierarchical subband encoding process called "set partitioning in hierarchical trees" (SPIHT) and leading from the original set of picture elements (pixels) of each group of frames to wavelet transform coefficients encoded with a binary format and constituting a hierarchical pyramid, said coefficients being organized into a spatio-temporal orientation tree rooted in the lowest frequency (or approximation subband) resulting from the 3D wavelet transform and completed by an offspring in the higher frequency subbands, the coefficients of said tree being ordered into partitioning sets involving the pixels and corresponding to respective levels of significance, said sets being defined by means of magnitude tests leading to a classification of the significance information in three ordered lists called list of insignificant sets (LIS), list of insignificant pixels (LIP) and list of significant pixels (LSP), said tests being carried out in order to divide said original set of pixels into said partitioning sets according to a division process that continues until each significant coefficient is encoded within said binary representation, and said spatio-temporal orientation tree defining the spatio-temporal relationship inside said hierarchical pyramid, and said SPIHT algorithm comprising the following steps:

initialization, sorting pass(es), refinement pass, and quantization step update, said method further comprising:

(a) in the initialization step:
the three coefficients corresponding to the same location in the three color planes Y, U and V are put sequentially in the LIS in order to occupy neighboring positions and to remain together in said LIS for the following sorting passes if they all have insignificant offspring when analyzed one after the other at each significance level;

the last bitplane for which insignificant offspring in luminance implies insignificant offspring in chrominance, $n_i$, is computed based on set significance level of the coefficients in the root subband and output in the bitstream;

(b) in the sorting pass(es) going from $n_{max}$ to $n_i$, when a luminance coefficient has insignificant offspring and if the three following conditions are satisfied by the two coefficients that follow said coefficient in the LIS:
they are U and V coefficients respectively;
they have the same spatio-temporal coordinates as said luminance coefficient;
they also have insignificant offspring; then this situation is coded by only a unique symbol, the output bitstream being not modified with respect to the original SPIHT algorithm in all the other cases.

2. An encoding method according to claim 1, wherein depending on the processed video sequence, said coding sub-step by means of a unique symbol is limited to the first significance levels and not applied to the lowest ones, the precise bit-plane level $n_i$ considered as the limit being defined during the initialization step by means of the following relation:

$$n_i = \min_{x,y,z} \{SSL_y(x,y,z) \text{ such as } SSL_y(x,y,z) \geq SSL_U(x,y,z) \text{ and } SSL_y(x,y,z) \geq SSL_y(x,y,z)\} \quad (1)$$

SSL being the set significance level associated to each coefficient and $n_{max}$ the maximum significance level.

* * * * *